United States Patent [19]

Schreiber et al.

[11] Patent Number: 4,663,210
[45] Date of Patent: May 5, 1987

[54] PANELING MEMBER FOR THE INTERIOR OF AUTOMOTIVE VEHICLES, ESPECIALLY A DASHBOARD

[75] Inventors: Reinhold Schreiber, Renningen; Arnold-William Ostle, Flacht; Walter Maier, Tiefenbronn; Heinz Loebert, Renningen, all of Fed. Rep. of Germany

[73] Assignee: Dr. Ing. H.c.F. Porsche Aktiengesellschaft, Fed. Rep. of Germany

[21] Appl. No.: 659,420

[22] Filed: Oct. 10, 1984

[30] Foreign Application Priority Data

Oct. 11, 1983 [DE] Fed. Rep. of Germany ....... 3336934

[51] Int. Cl.$^4$ .......................... B32B 1/04; B32B 1/06
[52] U.S. Cl. ..................... 428/160; 180/90; 280/752; 264/321; 428/63; 428/309.9; 428/316.6; 428/318.4; 428/319.1; 428/319.7
[58] Field of Search .............. 180/90; 296/70; 264/321; 428/309.9, 316.6, 318.4, 319.3, 319.7, 159, 160, 63, 319.1; 280/751, 752, 732, 743

[56] References Cited

U.S. PATENT DOCUMENTS

| | | | |
|---|---|---|---|
| 3,088,539 | 5/1963 | Mathues et al. | 428/319.1 |
| 3,897,848 | 8/1975 | Arnstson et al. | 180/90 |
| 3,922,429 | 11/1975 | Welch et al. | 428/316.6 |
| 3,930,664 | 1/1976 | Parr et al. | 180/90 |
| 4,060,280 | 11/1977 | Van Loo | 428/316.6 |
| 4,455,338 | 6/1984 | Henne | 428/316.6 |
| 4,456,640 | 6/1984 | Nishihara | 296/70 |
| 4,476,183 | 10/1984 | Holtrop et al. | 428/316.6 |

FOREIGN PATENT DOCUMENTS

| | | |
|---|---|---|
| 2061595 | 7/1972 | Fed. Rep. of Germany . |
| 2509368 | 9/1975 | Fed. Rep. of Germany . |
| 2417491 | 10/1975 | Fed. Rep. of Germany . |
| 2608392 | 1/1977 | Fed. Rep. of Germany . |
| 2614050 | 10/1977 | Fed. Rep. of Germany . |

OTHER PUBLICATIONS

Schaum Kunststoffe-Entwicklungen und Anwendungen (Developments & (Utlizations) published 1971 by Carl Hanser Publishing Com., Munchen/Wien (W. Germany/Austria).
Die Karosserie des Porsche 924—Schwerpunkte der Entwicklung (The Body of the Porsche 924—Development Criteria) published by ATZ Automobiltechnische Zeitschrift 79 (1977) 2 (ATZ Automobile Technical Magazine #79 in 1971.

Primary Examiner—William J. Van Balen
Attorney, Agent, or Firm—Barnes & Thornburg

[57] ABSTRACT

A paneling member for the interior of automotive vehicles, especially a dashboard, is constructed of at least two covered polyurethane foam portions which are provided with a stiffening support element embedded in the foam. The foam body portions have different weights per unit volume and compressive strengths and, accordingly, different degrees of hardness. A relatively firm foam body with an ABS or PVC sheet covering is used for the upper portion of the paneling member. A softer foam body with a covering selected from one of a variety of materials is used to form the lower portion of the paneling member.

13 Claims, 2 Drawing Figures

PANELING MEMBER FOR THE INTERIOR OF AUTOMOTIVE VEHICLES, ESPECIALLY A DASHBOARD

BACKGROUND AND SUMMARY OF THE INVENTION

This invention relates to a paneling member for the interior of automotive vehicles, especially a dashboard. The paneling member is provided with a covering that is foam-backed on its rear face with a semihard polyurethane foam. A rigidifying supporting element is embedded within the polyurethane foam body.

A dashboard of this type is discussed in the article "Die Karosserie des Porsche 924", page 7, special edition of ATZ [Automobile News], Nos. 2 and 3 of 1977. The dashboard shown in that article has a supporting member molded into a semihard polyurethane foam body, and the foam body is covered on the side facing the passenger compartment with a covering of vacuum-formed ABS sheet. For reasons of dimensional stability (i.e, to prevent visible dents from forming upon impact to the dashboard), the semihard polyurethane foam is required to be of a relatively hard grade. This is also necessary in order to be able to form the dashboard with pronounced contours which match the contours of the ABS or PVC covering sheet employed (e.g., in the region of the instruments).

A drawback to the use of a relatively hard grade of semihard polyurethane foam is that, in the event of unintended contacts with the lower zone of the dashboard (such as might occur upon entering the vehicle or in an accident), grave knee injuries can occur. Furthermore, the configuration described above restricts design possibilities since variations are limited to the use of differing colors and textures of the ABS or PVC covering sheet.

It is an object of this invention to provide a paneling member —especially a dashboard—for the interior of an automotive vehicle, having an upper region which is dimensionally stable and which can be formed with pronounced contours, and having a lower region which is provided with comfort-enhancing and injury-reducing properties.

This object is attained, according to the present invention, by forming the paneling member of at least two portions, each portion comprising a polyurethane foam body and covering. The foam bodies comprising the two portions have different weights per unit volume and different compressive strengths. The coverings for each of the foam bodies are preferably made of different materials. One portion of the member forms the upper region or zone, of the paneling member, while another portion forms the lower zone. The zones extend across the entire width of the member.

The covering for the upper portion (zone A) is preferably formed by deep-drawing a sheet-like material, such as ABS or PVC sheet. The covering of the lower portion (zone B) is formed from one of a variety of materials, including: a foam sheet, a synthetic leather-like material, such as vinyl; leather; imitation leather; and a textile fabric. The coverings for the two portions are joined at an upright wall in a recess of the paneling member. The joint is covered by a strip which fits into the recess.

The advantages achieved by means of this invention result from the fact that the paneling member has a regionally differing design, i.e., different coverings and polyurethane foam components with varying degrees of hardness are used. This design not only meets the requirements imposed by the manufacturing techniques and functional considerations, but also is an improvement with respect to stylistic design possibilities.

By using a relatively firm, semihard polyurethane foam body and a deep-drawn PVC or ABS covering sheet in the upper zone of the dashboard, the sharp-edged transitions (pronounced contours) in the area of the moldings for the instruments can be satisfactorily produced, and the foamed body returns to and retains its original shape following the application of pressure from a load or impact.

A relatively soft-grade, semihard polyurethane foam is used in the lower region of the dashboard whereby a dashboard resiliency is obtained which mitigates injuries. The covering for the lower region is made of foamed sheet, synthetic leather-like materials (such as vinyl, leather, imitation leather, textile fabric, or the like.

Moreover, the styling design possibilities are increased by the regionally differing structure of the paneling member since a variety of covering materials, with contrasting coloring in the various zones, can be employed.

Further objects, features, and advantages of the present invention will become more apparent from the following description and accompanying drawings which show, for purposes of illustration only, an embodiment in accordance with the present invention.

DETAILED DESCRIPTION OF THE DRAWINGS

Figure 1:
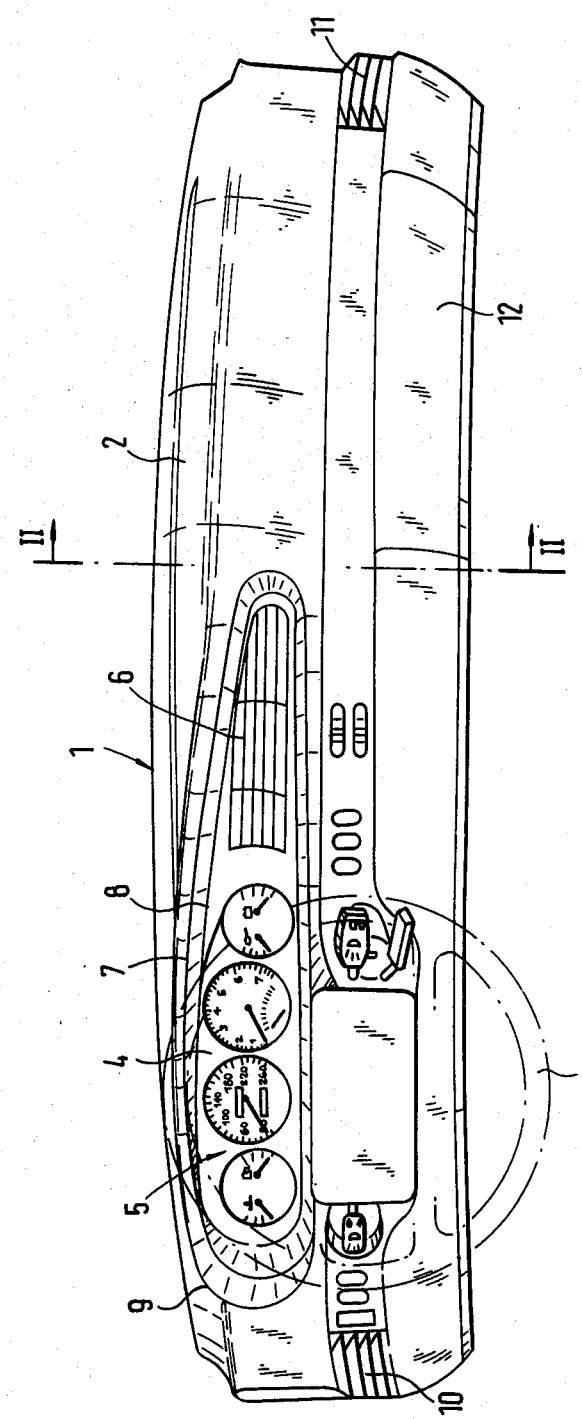
FIG. 1 shows a frontal view of a dashboard constructed in accordance with the present invention.

Paneling member 1, as illustrated in the embodiment shown in FIG. 1, comprises a dashboard 2 having a molding 4, in the proximity of a steering wheel 3, wherein indicator instruments 5 and an air-distributing vent 6 are arranged. Molding 4 is defined by pronounced contours 7, 8 and 9. Dashboard 2 furthermore includes air-distributing vents 10 and 11 arranged laterally on the outside edges, as well as a glove compartment, not illustrated in detail, which can be closed by a flap 12.

Figure 2:
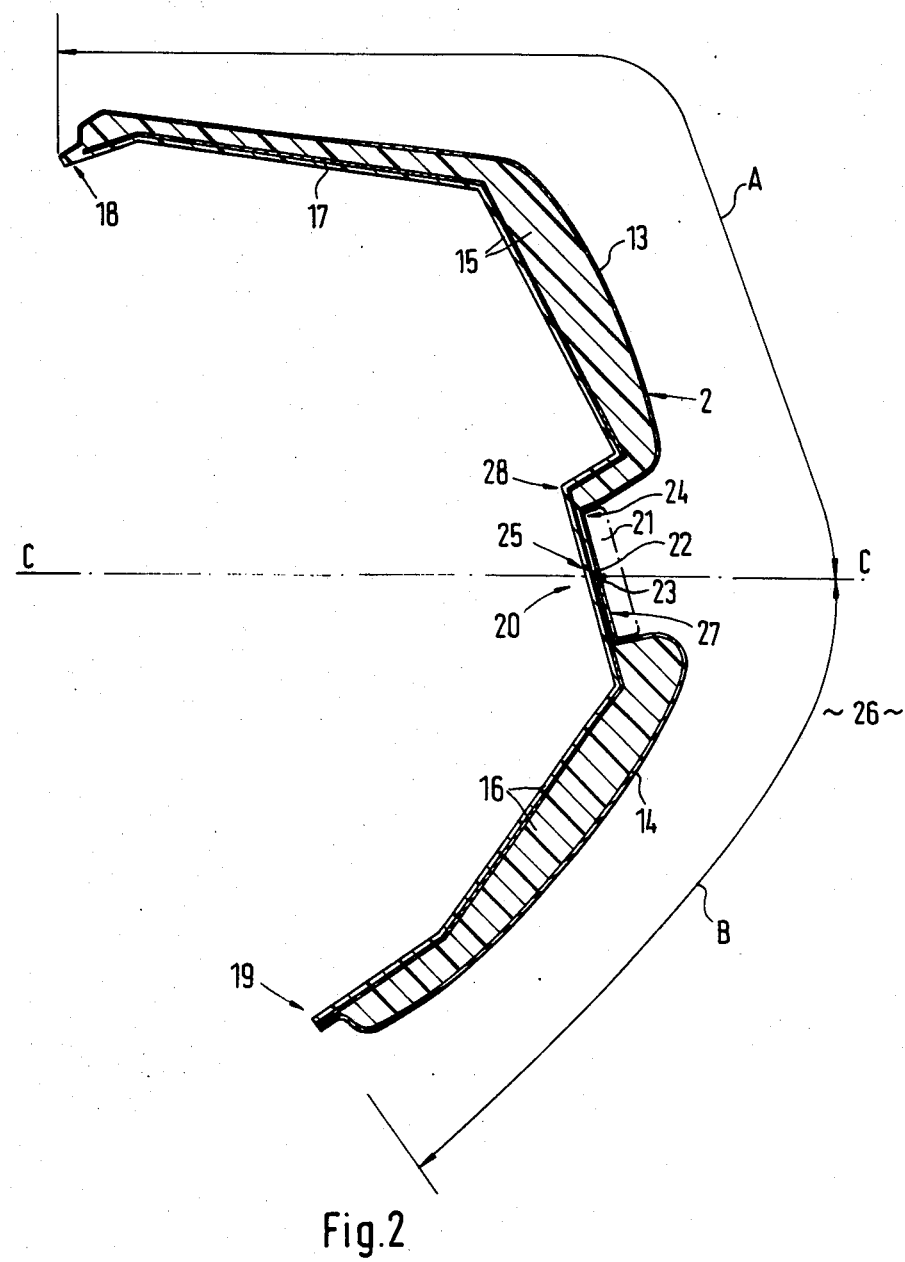
FIG. 2 shows a section along line II—II of FIG. 1.

Dashboard 2 is composed of at least two zones A and B arranged in upper and lower relation, as shown in FIG. 2. Coverings 13 and 14 in these zones consist of different materials, and polyurethane foam bodies 15 and 16 have differing degrees of hardness (i.e., they differ in weight per unit volume and compressive strength).

A relatively hard-grade, semihard polyurethane foam body 15, having a weight per unit volume of 120 ±30 kilograms per cubic meter (kg/m$^3$) and a compressive strength of 120–180 kilopascals (kPa), is utilized in zone A of dashboard 2. Covering 13 of ABS or PVC sheet (or the like) is applied to this foam body.

In zone B of dashboard 2, a relatively soft-grade, semihard polyurethane foam body 16, having a weight per volume of 100 ±30 kg/m$^3$ and a compressive strength of 25–35 kPa is utilized. Foam body 16 is provided with covering 14, which is, selectively, a foamed sheet, a synthetic leather-like material (such as vinyl), leather, imitation leather, a textile fabric, or the like. The combination of the relatively soft-grade, semihard polyurethane foam body 16 and the aforementioned materials for covering 14 provide an injury-reducing resiliency in the lower region of the dashboard, on the one hand, and a desirable dimensional stabilty in this region (i.e., zone B), on the other hand.

Zone A extends above horizontal plane C—C, whereas zone B extends downwardly away from plane C—C.

For rigidifying the dashboard, a supporting element 17 is embedded within the polyurethane foam bodies 15 and 16 (i.e., supporting element 17 is surrounded on all sides by polyurethane foam bodies 15 and 16). Supporting element 17 extends continuously from an upper marginal section 18 to a lower marginal section 19 and has a profiled configuration. As shown in FIG. 2, supporting element 17 consists of a deep-drawn sheet-metal part. However, it is also possible to make supporting element 17 of a synthetic resin.

Coverings 13 and 14 of zones A and B are joined at an upright wall 20 of paneling member 1. This joint is concealed by means of a strip 21, shown in dot-dash lines. The two end sections 22 and 23 of coverings 13 and 14 can abut as shown in FIG. 2, or they can be designed to overlap. Strip 21, consisting of a synthetic resin, ornamental wood, or the like, is attached to dashboard 2 by screws or clips. As shown in FIG. 2, paneling member 1 is provided with a recess 24 which receives strip 21.

A transition zone 25 between upper polyurethane foam body 15 and lower polyurethane foam body 16 lies approximately in the region of the plane C—C. The two polyurethane foam bodies 15 and 16 have, in the region of recess 24 of side 27 facing passenger compartment 26, a substantially reduced wall thickness, as compared to the thickness in other regions.

On side 28 facing away from passenger compartment 26, foam bodies 15 and 16 exhibit a uniform, relatively thin wall thickness from the upper marginal section 18 to the lower marginal section 19.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A paneling member for the interior of automotive vehicles, comprising:
    a first arcuate foam body portion extending upwardly from a generally horiaontal plane and having a first covering on an outer surface thereof;
    a second arcuate foam body portion extending downwardly from said plane and having a second covering on an outer surface thereof; and
    a support element embedded in said first and second foam body portions, said support element extending continuously from an upper marginal section of said first foam body portion to a lower maginal section of said second foam body portion;
    wherein said first foam body portion is formed of a relatively hard-grade semihard polyurethane foam and is covered on said outer surface by said first covering; and
    wherein said second foam body portion is formed of a relatively soft-grade semihard polyurethane foam and is covered on said outer surface by said second covering.

2. A paneling member according to claim 1, wherein said first foam body is formed of a foam which has a weight per unit volume of $120\pm30$ kg/m$^3$ and a compressive strength of 120-180 kPa.

3. A paneling member according to claim 1, wherein said covering for said first foam body is formed from a deep-drawn sheet material.

4. A paneling member according to claim 3, wherein said second covering is one an ABS sheet material and a PVC sheet material.

5. A paneling member according to claim 1, wherein said second foam body is formed of a foam which has a weight per unit volume of $100\pm30$ kg/m$^3$ and a compressive strength of 25-35 kPa.

6. A paneling member according to claim 1, wherein said covering for said second foam body is formed of one of a foam sheet, a synthetic leather-like material, a leather, and a textile fabric.

7. A paneling member according to claim 1, wherein said first and second body portions form a joint at an upright wall of the paneling member and wherein said joint is covered by a strip.

8. A paneling member according to claim 7, wherein the paneling member has a recess formed therein for receiving the strip.

9. A paneling member for the interior of a vehicle, comprising:
    arcuate supporting element means having upper and lower sections,
    a first polyurethane foam body portion surrounding said upper section, said first body portion comprising a relatively hard-grade semihard polyurethane foam,
    a second polyurethane foam body portion surrounding said lower section, said second foam body portion comprising a relatively soft-grade semihard polyurethane foam,
    first covering means for covering said first foam body portion comprising sheet material selected from the group consisting of ABS and PVC, and
    second covering means for covering said second foam body portion comprising materials selected from the group consisting of foam sheet, synthetic leather-like material, leather, and textile fabric,
    wherein said support element means extends continuously from said upper section to said lower section.

10. A paneling member according to claim 9, wherein said first foam body is formed of a foam which has a weight per unit volume of $120\pm30$ kg/m$^3$ and a compressive strength of 120-180 kPa.

11. A paneling member according to claim 9, wherein said second foam body is formed of a foam which has a weight per unit volume of $100\pm30$ kg/m$^3$ and a compressive strength of 25-35 kPa.

12. A paneling member according to claim 9, wherein said first and second body portions form a joint at an upright wall of the paneling member and wherein said joint is covered by a strip.

13. A paneling member according to claim 12, wherein the paneling member has a recess formed therein for receiving the strip.

* * * * *